Patented June 12, 1951

2,556,990

UNITED STATES PATENT OFFICE 2,556,990

STYRENE - 2 - PROPENYL ALCOHOL - DI - 2-PROPENYL ITACONATE INTERPOLYMER

Pliny O. Tawney, Passaic, N. J., assignor to United States Rubber Company, New York, N. Y., a corporation of New Jersey No Drawing. Application July 3, 1946,
Serial No. 681,428

5 Claims. (Cl. 260—78.5)

My invention is concerned with a new class of unsaturated polymeric materials of relatively low molecular weight which are soluble in a variety of solvents and which, in the presence of heat and/or catalysts, can be converted to insoluble, infusible products by further polymerization or by copolymerization with other unsaturated organic materials capable of addition polymerization. The invention also includes the method for preparing these new products. My new unsaturated ternary interpolymers are prepared by polymerizing a monomeric mixture of styrene, a di-2-propenyl itaconate and a 2-propenyl alcohol.

Compared to copolymers of a di-2-propenyl itaconate and a 2-propenyl alcohol, disclosed by me in a copending application Serial No. 681,427, filed July 3, 1946, the present interpolymers fulfill a need for a softer and more flexible copolymer of higher dielectric strength and greater compatibility with hydrocarbon solvents, the latter property being particularly significant in the preparation of cheap coating compositions.

The copolymerization of di-2-propenyl itaconates with various vinyl compounds such as styrene is well known to the art, but the tendency of such mixtures to form insoluble gels before any very substantial amount of the monomers has been converted to the polymeric form has seriously restricted their commercial utilization. Existing preparative methods entail interrupting the copolymerization before gelation occurs and isolating the soluble, fusible copolymer. This method is both inefficient and uneconomical since the copolymer is obtained in low yields and the large amount of unreacted monomers must be isolated, purified and recycled for subsequent copolymerizations. Copolymerization in the presence of a solvent effects some increase in the yield of soluble copolymer if the total concentration of monomers is kept below 40% by weight. However, the rate of polymerization tends to decrease in dilute solutions, the conversion of monomers to copolymer is still comparatively inefficient and the solvent increases the material cost, necessitates additional time and labor for its removal and lowers the production capacity of the reaction vessel. The proposals to use high temperatures and/or large amounts of peroxide catalyst to improve the yield are of dubious value since under such stringent conditions the copolymerization reaction is difficult to control, particularly in reaction vessels of industrial size, and premature insolubilization of the reaction mixture becomes increasingly difficult to avoid.

I have now discovered unexpectedly that copolymerizing styrene with a di-2-propenyl itaconate in the presence of a sufficient amount of a 2-propenyl alcohol, by heating the mixture preferably at temperatures below 120° C. and in the presence of conventional peroxidic catalysts, gives high yields of soluble, fusible interpolymers. The reaction temperatures employed range from about 25° C. to about 120° C., although higher temperatures can be employed, if desired. Examples of suitable peroxy compound catalysts, include acetyl peroxide, benzoyl peroxide, acetyl benzoyl peroxide, succinyl peroxide, and tertiary-butyl hydrogen peroxide. The catalyst concentration is preferably maintained in the range of from 1 to 3 mole percent of the mixture of polymerizable monomers.

The course of the copolymerization can be followed by observing the increase in the viscosity of the reaction mixture, and when the copolymerization has proceeded to the desired extent, the reaction is halted by cooling. The resulting copolymer can be recovered from the reaction mixture by distilling out any unreacted starting materials or by extracting them with a solvent in which the copolymer is insoluble such as n-hexene. The copolymer can be further purified by dissolving it in a solvent such as acetone and precipitating it with n-hexane.

The total concentration of the monomers does not have to be kept below 40%; in fact the reaction can be carried out in the absence of any solvent other than the copolymerizable monomers themselves. The relative proportions of styrene, the di-2-propenyl itaconate and the 2-propenyl alcohol can be varied over a considerable range depending upon the physical properties and the amount of hydroxymethyl groups desired to be present in the polymeric product. Copolymerization of a mixture of styrene and a di-2-propenyl itaconate with as little as approximately 10% of the 2-propenyl alcohol (based on the weight of the di-2-propenyl itaconate) represses gelation of the reaction mixture during the early stages of the copolymerization, and ensures the production of a soluble, fusible product. The higher the amount of the 2-propenyl alcohol present, the higher is the proportion of the monomeric styrene and di-2-propenyl itaconate which can be converted to the interpolymeric form without insolubilization, and optimum yields can be obtained with 300% of the 2-propenyl alcohol present.

Since my interpolymers are soluble in 2-propenyl alcohols, I prefer to carry out the copolymerizations in the presence of an excess of the 2-propenyl alcohol, e. g., 600%, for the resulting mobile free-flowing solutions are easily handled in transfer, mixing, storage and other mechanical operations to which the solid copolymers themselves might be less amenable. The 2-propenyl alcohol in my invention may thus serve not only as a copolymerizable monomer but also as a cheap, volatile solvent which, because it shows little tendency to homopolymerize under these conditions, can be easily removed from the reaction mixture by distillation and recovered for use in subsequent copolymerizations.

The di-2-propenyl itaconates which I have found to be most suitable in the practice of my invention are diallyl itaconate and dimethallyl itaconate. The preferred 2-propenyl alcohols are allyl and methallyl alcohol. The styrene may be replaced in whole or part by para-substituted styrenes such as p-methyl styrene and p-chlorostyrene. Accordingly, these vinyl aromatic compounds may be represented by the formula

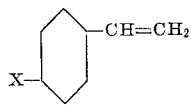

where X is hydrogen, methyl, or chlorine.

That my products are true ternary interpolymers is indicated by elementary analysis and other specific tests. They contain, attached to the polymer chain, hydroxymethyl groups derived from the interpolymerized 2-propenyl alcohol molecules which render the interpolymer capable of modification by agents known to react with primary alcohols, such agents including alkyl, 2-alkenyl and acyl halides, organic acids and their anhydrides, organic isocyanates and isothiocyanates, aldehydes, etc., as well as the corresponding polyfunctional compounds such as the dihalides, diisocyanates, polycarboxylic acids, etc. By such reactions my new interpolymers can be converted into other modified polymers having desirable properties.

My interpolymers can be cast or molded in a known manner to form rods, blocks, or sheets. They can also be dissolved in an appropriate solvent and employed as lacquers, or as coating and impregnating compositions.

Application of heat to compositions containing my unsaturated interpolymers, particularly in the presence of catalyst, induces further polymerization and the resulting cross-linked products are quite indifferent to heat and are strongly resistant to attack by solvents such as acetone and xylene. Suitable dyes, pigments, fillers and plasticizers can be incorporated with my interpolymers at the soluble, fusible stage prior to final cure.

My unsaturated interpolymers can be dissolved in organic solvents, particularly in copolymerizable compounds containing an ethylenic linkage, such as vinyl acetate, methyl methacrylate, methyl acrylate, diallyl fumarate, allyl acrylate, etc. The resulting solutions can be totally copolymerized to insoluble, infusible products without leaving any solvent to be evaporated. Even at high solids content, many of these solutions are still quite fluid and can be employed as coating materials by spraying, brushing and dipping. They can also be utilized in casting, laminating and impregnating operations, particularly where articles capable of being pre-formed and then "set" or cured in a final shape are desired.

Products of even lower molecular weight can be prepared by carrying out the initial copolymerization in the presence of regulators such as carbon tetrachloride.

The following examples illustrate my invention in more detail, all parts being by weight.

EXAMPLE 1

To illustrate my discovery that by copolymerizing mixtures of styrene and a di-2-propenyl itaconate with a 2-propenyl alcohol, gelation of the reaction mixture can be repressed, mixtures containing monomeric styrene, monomeric diallyl itaconate and various amounts of allyl alcohol are heated at 60° C. with benzoyl peroxide as catalyst, to the point of incipient gelation. The interpolymerizations are then halted by rapid chilling, and the reaction mixtures are poured into n-hexane, precipitating the interpolymers which are further purified by repeated solution in acetone and precipitation with n-hexane. The polymeric solids are then dried in vacuo to constant weight. The data are summarized below in the table, where the numbers refer to parts by weight, unless otherwise indicated. Although not within the scope of my invention, the copolymerization of styrene with diallyl itaconate in the absence of allyl alcohol is also included (I—a) for purposes of comparison in order to more clearly demonstrate the advantage of my invention.

Table

| Ex. | Styrene | Diallyl Itaconate | Allyl Alcohol | Benzoyl Peroxide | Time to Gelation, hours | Interpolymer |
|---|---|---|---|---|---|---|
| a | 10.4 | 21.1 | --------- | 0.485 | 2.1 | 8.16 |
| b | 10.4 | 21.1 | 2.91 | 0.605 | 1.8 | 9.4 |
| c | 10.4 | 21.1 | 11.60 | 1.935 | 4.0 | 17.4 |
| d | 10.4 | 21.1 | 17.40 | 2.42 | 6.3 | 22.6 |
| e | 10.4 | 21.1 | 25.82 | 3.23 | 10.7 | 25.3 |
| f | 10.4 | 21.1 | 46.50 | 4.84 | 27.0 | 30.2 |

Comparison of I—a and I—b above shows that the presence of as little as 10% of the copolymerizable 2-propenyl alcohol will increase the yield of soluble fusible interpolymer. Succeeding examples in Table I indicate that with increasing amounts of the 2-propenyl alcohol present, a large proportion of the monomeric styrene and di-2-propenyl itaconate can be converted to the interpolymeric form without insolubilization.

A sample of the crude reaction mixture of I—b is poured onto a glass panel and baked at 200° C. for 0.4 hour to yield a clear, colorless acetone solvent-resistant film which undergoes surprisingly little discoloration by heating for an additional hour at 200° C.

EXAMPLE 2

A mixture of 34.7 parts of styrene, 70.1 parts of diallyl itaconate, 419.2 parts of allyl alcohol and 1.617 parts of benzoyl peroxide is heated for 24 hours at 96–98° C. The major proportion of the unreacted allyl alcohol is then removed by distillation under diminished pressure and the residue is purified in the manner of Example 1 above, to yield 77.5 parts of polymeric solid which is soluble in acetone, chloroform allylic alcohol, benzene, xylene and xylene-butanol mixtures.

*Analysis*

Found: C, 71.09%; H, 7.24%; iodine number (Wijs) 135.1; limiting viscosity $[\eta]_0$, in acetone 0.045.

The exact composition of the interpolymer cannot be determined with any high degree of precision, but the analysis indicates a ternary interpolymer derived from approximately 28.0% by weight of styrene, 65.4% of diallyl itaconate and 6.6% of allyl alcohol. This corresponds to a conversion of approximately 72.0% of the monomeric diallyl itaconate and 62.5% of the monomeric styrene to the interpolymeric form. The iodine number also indicates the large amount of diallyl itaconate which has been incorporated in the interpolymer whose residual unsaturation is available for further polymerization or for copolymerization with reactive monomers.

The following illustrates the copolymerization of my interpolymers with polymerizable ethylenic compounds to yield insoluble infusible products. Seven parts of the interpolymer from above are dissolved in 3.0 parts of monomeric diethyl fumarate together with 0.20 part of benzoyl peroxide and the solution is heated in a mold for 16.3 hours at 60° C. and then for 21.1 hours at 120° C. The resulting casting is clear, solvent-resistant and has a Rockwell hardness of L-102.

A hard tough casting is also obtained by heating a solution of 6.0 parts of the soluble interpolymer in 2.59 parts of methyl acrylate together with 0.073 part of benzoyl peroxide for 24 hours at 60° C. and then for 0.5 hours at 120° C. Similarly, heating a mixture of 1.0 part of the interpolymer, 18.0 parts of styrene and 0.209 part of benzoyl peroxide at 60° C. for 21.2 hours and then at 120° C. for 24 hours yields a heat-resistant casting.

A solution of 4.0 parts of the interpolymer dissolved in a mixture of 3.0 parts of xylene, 3.0 parts of n-butanol and 0.5 part of cyclohexanone is flowed onto a glass panel and baked for 45 minutes at 200° C. to yield a clear, colorless, solvent and heat-resistant film.

EXAMPLE 3

A mixture of 52.1 parts of styrene, 52.6 parts of diallyl itaconate, 418.8 parts of allyl alcohol and 1.17 parts of a 60% aqueous solution of tertiary-butyl hydrogen peroxide is heated at reflux for 24 hours. After purification of the syrupy reaction mixture, 84.9 parts of polymeric solid are obtained, which is soluble in benzene, xylene and 2-propenyl alcohol.

Analysis

Found: iodine number, 113.8; $[\eta]_0 = 0.055$.

Twenty-one parts of the interpolymer are dissolved in 9.0 parts of monomeric diethyl fumarate, admixed with 0.6 part of benzoyl peroxide and heated for 23 hours at 60° C. followed by 2 hours at 120° C. to yield a clear, solvent and heat-resistant casting which has a Rockwell hardness of L-98 and M-77.

Two sheets of glass cloth are saturated with another sample of the above solution and bonded together by heating at 120° C. for 1.1 hours. A clear tough laminate is obtained which does not disintegrate when immersed in solvents such as acetone and benzene.

A solution of 5.0 parts of the interpolymer dissolved in a mixture of 4.3 parts of xylene, 4.3 parts of n-butanol and 0.5 part of cyclohexanone is flowed onto a glass panel and baked at 200° C. for 55 minutes to yield a clear solvent-resistant film.

EXAMPLE 4

Upon heating a mixture of 34.7 parts of styrene, 70.1 parts of diallyl itaconate, 419.2 parts of methallyl alcohol and 1.62 parts of benzoyl peroxide for 24 hours at reflux, a viscous reaction product is obtained which upon purification yields 66.7 parts of polymeric solid. The interpolymer is soluble in acetone, chloroform, xylene and hot n-butanol.

Analysis

Found: C, 72.03%; H, 7.49%; Iodine Number 120.9; $[\eta]_0 = 0.047$.

A solution of 5.0 parts of the interpolymer dissolved in a mixture of 2.8 parts of xylene, 2.8 parts of n-butanol and 0.5 part of cyclohexanone is flowed onto a glass panel and baked for 40 minutes at 200° C. The resulting film is clear, colorless and not attacked by acetone.

Two sheets of glass cloth are saturated with a solution of 14.0 parts of the interpolymer dissolved in 6.0 parts of diethyl fumarate together with 0.4 part of benozyl peroxide, and are bonded together by baking for 45 minutes at 120° C. The resulting laminate is tough and acetone solvent-resistant.

A solution of 7.0 parts of the interpolymer dissolved in 3.0 parts of vinyl acetate together with 0.2 part of benzoyl peroxide is heated in a mold for 17.7 hours at 60° C. The resulting casting is clear, heat-resistant and insoluble in acetone.

While I have shown and described various embodiments of the invention, it is to be understood that the invention is susceptible to those modifications which appear within the spirit of the invention and the scope of the appended claims.

Having thus described my invention, what I claim and desire to protect by Letters Patent is:

1. A polymerizable mix, polymerizable by the addition of a peroxidic catalyst, said mix being composed of a compound of the formula

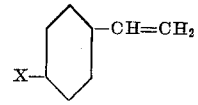

where X is selected from the class consisting of hydrogen, methyl, and chlorine, a monomeric 2-propen-1-ol diester of itaconic acid and a monomeric 2-propenyl alcohol in which the alcohol for the latter two monomers is selected from the class consisting of allyl alcohol and methallyl alcohol, and the proportion of the monomeric 2-propenyl alcohol being at least 10% based on the weight of the itaconate ester.

2. An acetone-soluble unsaturated interpolymerizate of styrene, a monomeric 2-propen-1-ol diester of itaconic acid and a monomeric 2-propenyl alcohol in which the alcohol for the latter two monomers is selected from the class consisting of allyl alcohol and methallyl alcohol, and the proportion of the monomeric 2-propenyl alcohol being at least 10% based on the weight of the itaconate ester.

3. An acetone-soluble unsaturated interpolymerizate of styrene, monomeric allyl alcohol and diallyl itaconate, the proportion of said alcohol being at least 10% based on the weight of the itaconate.

4. An acetone-soluble unsaturated interpolymerizate of styrene, monomeric methallyl alcohol and diallyl itaconate, the proportion of said alcohol being at least 10% based on the weight of the itaconate.

5. A method which comprises polymerizing styrene with a 2-propen-1-ol diester of itaconic acid in the presence of at least about 10%, based on the weight of the itaconate, of a monomeric 2-propenyl alcohol, in which the alcohol for both the itaconate and the alcohol is selected from the class consisting of allyl alcohol and methallyl alcohol, the polymerization being carried out in the presence of a peroxidic compound and at a temperature in the range from about 25° C. to about 120° C., and halting the polymerization before the gel point to form a high yield of an acetone-soluble unsaturated interpolymerizate of styrene, the monomeric itaconate, and the said alcohol.

PLINY O. TAWNEY.

REFERENCES CITED

The following references are of record in the file of this patent:

UNITED STATES PATENTS

| Number | Name | Date |
| --- | --- | --- |
| 2,273,891 | Pollack et al. | Feb. 24, 1942 |
| 2,378,175 | D'Alelio | June 12, 1945 |
| 2,441,515 | Snyder | May 11, 1948 |
| 2,504,052 | Snyder | Apr. 11, 1950 |